United States Patent Office 2,866,830
Patented Dec. 30, 1958

2,866,830

FIXED BED OXYCHLORINATION OF HYDROCARBONS

James L. Dunn, Jr., and Bob Posey, Jr., Lake Jackson, Tex., assignors to The Dow Chemical Company, Midland, Mich., a corporation of Delaware No Drawing. Application May 31, 1956
Serial No. 588,253

6 Claims. (Cl. 260—650)

This invention relates to the oxychlorination of hydrocarbons. It is concerned primarily with a means for assuring substantially uniform temperatures in fixed bed reactors during the reaction between a hydrocarbon, hydrogen chloride and oxygen in contact with cupric chloride.

It is well known that hydrocarbons can be chlorinated by passing them together with hydrogen chloride and air or oxygen into contact with cupric chloride. The cupric chloride is usually supported on a porous inert solid such as pumice, activated alumina, or diatomaceous earth. For satisfactory results, each hydrocarbon has an optimum chlorination temperature. Thus, benzene can be oxychlorinated to monochlorobenzene at 275–300° C.; ethylene reacts to give 1,2-dichloroethane in best yields at temperatures near 315° C. and to higher chlorinated products at higher temperatures; and methane gives the highest yields of methyl chloride and methylene chloride in an oxychlorination reaction at temperatures near 450° C.

It is also known that the oxychlorination of hydrocarbons over a fixed bed of supported cupric chloride is accompanied by the occurrence of hot spots in the catalyst bed, and that such hot spots result in the combustion of part of the hydrocarbon as well as the formation of higher chlorination products. The conversion of hydrocarbons to desired mono- and dichloro compounds, in a single pass through a fixed bed has been low, and the yields of desired products have been low when fixed bed reactors are used. To avoid the disadvantages of fixed bed operations, much attention has been given to the use of fluidized beds of supported cupric chloride in oxychlorination reactions. It is a characteristic of fluid beds that temperatures and compositions are uniform throughout the bed. While this eliminates hot spots, it presents other problems. Thus, when used for oxychlorinations, fluid beds cause high losses of hydrogen chloride which is carried out with the effluent nitrogen and unreacted hydrocarbon. Further, the unused hydrocarbon cannot be recycled because of the large amounts of nitrogen with which it is diluted. Another disadvantage of fluid bed oxychlorination systems lies in the inherent loss in unrecoverable form of cupric chloride (or cuprous chloride or cupric oxychloride) as a fine dust carried out with the effluent gases.

Since the principal disadvantage of fixed bed oxychlorination systems is their proclivity for developing hot spots, attempts have been made to dilute the catalyst mass with untreated particles of the same material as is used to support the copper chloride. Thus, when the copper chloride is supported on pumice, untreated particles of pumice have been used as a diluent for the mass. This has been only partly successful. Hot spots have been displaced from their normal position near the inlet end of the reactor, and their effect has been reduced, but it is found that the use of the previously suggested diluents does not result in establishing a uniform temperature in the reactor and temperature gradients of the order of 100 centigrade degrees have been observed. Since any temperature below the minimum reaction temperature represents wasted capacity in the equipment, and temperatures above the optimum temperature for the desired chlorination lead to the formation of higher chlorination products, such temperature gradients are undesirable and are indicative of inefficient operation.

It would be desirable to have and it is among the principal objects of this invention to provide means for carrying out oxychlorination reactions over fixed beds of copper chlorides on inert supports such that the reaction proceeds without developing hot spots in the reactor and without any significant temperature gradient in the reaction zone.

According to the present invention, the foregoing and related objects are attained by effecting the oxychlorination reaction over a fixed bed of a catalyst mass consisting of a chloride of copper on a conventional inert support, intimately mixed with from 3 to 20 volumes of silicon carbide particles for each volume of the catalyst mass. The catalyst mass itself may contain from about 5 to about 20 percent by weight of a chloride of copper on coarse particles of such inert supports as alumina, silica gel, pumice, diatomaceous earth, and the like. The average particle size of the inert support is chosen in the usual manner to allow free passage of the reagent gases while providing a large contact area. Commonly the particles are of a size to pass a 4 mesh screen and to rest on a 10 mesh screen (U. S. Sieve Series), though other sizes may be used. The silicon carbide particles mixed with the catalyst are conveniently chosen of a size comparable with that of the average catalyst particles, though they may be somewhat finer, so long as they do not materially affect the flow of gases through the reactor.

The use of the here-described mixture of silicon carbide and supported chloride of copper in a fixed bed oxychlorination zone surprisingly eliminates hot spots and gives freedom from significant temperature gradients, i. e., it makes possible a substantially uniform temperature throughout the reaction zone. This results in greater efficiency and in higher yields of the desired product per pass of reagents through the reactor than has been possible in such reactions heretofore.

If less than about 3 parts by volume of silicon carbide particles are used for each volume of catalyst, the temperature control is less precise and the advantages of the invention are greatly diminished. If over 20 volumes of silicon carbide are used per volume of catalyst the capacity of the equipment to effect chlorination is greatly reduced and it is necessary either to diminish the feed rate or to lengthen the reactor to uneconomical extents.

It is not clear why the present invention is successful while the prior use of other diluents was not. The difference cannot be explained on the basis of any great difference in thermal conductivity, since silicon carbide is a poor heat conductor.

The following examples illustrate the practice of the invention. The catalyst employed in the examples was prepared by saturating 10 mesh particles of alumina with a solution of cupric chloride in water, and then drying the mass to leave about 14 percent by weight of cupric chloride on the alumina. A vertically disposed nickel tube, 2 inches in internal diameter and 5 feet long was filled with the catalyst mass, with or without diluent, as detailed in the examples, and the tube was heated externally by a heat transfer fluid circulating at 250° C. through an external jacket. Temperature readings were made at 6 inch intervals along the tube with the aid of thermocouples. The reagent gases (hydrocarbon, hydrogen chloride and air) were admitted at the top and the gaseous effluent was removed from the bottom, condensed and recovered in the usual manner. The flow rates were chosen so that the effluent stream contained little if any unchanged HCl. In some runs, as noted, undiluted catalyst caused hot spots which melted a hole in the reactor, causing loss of any product, and carbonization of the feed.

Example 1

The hydrocarbon employed was ethylene, and the desired product was 1,2-dichloroethane. Three series of runs were made. In the first series the catalyst was undiluted, in the second it was diluted with alumina, and in the third the diluent was silicon carbide. The results are given in the following table:

|  | Series 1 | Series 2 | Series 3 |
|---|---|---|---|
| Catalyst volume: Diluent Volume: |  |  |  |
| Top foot | 100:0 | 5.6:94.4 | 5.6:94.4 |
| Second foot | 100:0 | 6.7:93.3 | 6.7:93.3 |
| Third foot | 100:0 | 8.3:91.7 | 8.3:91.7 |
| Fourth foot | 100:0 | 11.1:88.9 | 11.1:88.9 |
| Fifth foot | 100:0 | 16.7:83.3 | 16.7:83.3 |
| Flow rates, relative: |  |  |  |
| Hydrogen chloride, pounds | 22.2 | 22.0 | 22.8 |
| Ethylene, pounds | 6.0 | 6.0 | 10.0 |
| Air, pounds | 33.0 | 33.0 | 36.0 |
| Gas-catalyst contact time, seconds | 3.05 | 3.05 | 2.5 |
| Temperature in reactor, °C.: |  |  |  |
| Inlet | 250 | 250 | 250 |
| 0.5 foot from top | over 600 | 275 | 312 |
| 1.0 foot from top |  | 295 | 316 |
| 1.5 feet from top | Thermo- | 318 | 318 |
| 2.0 feet from top | couples | 348 | 316 |
| 2.5 feet from top | and reactor | 366 | 312 |
| 3.0 feet from top | melted, no | 340 | 309 |
| 3.5 feet from top | product | 313 | 307 |
| 4.0 feet from top | obtained. | 295 | 309 |
| 4.5 feet from top |  | 275 | 310 |
| Temperature gradient, centigrade degrees | over 300 | 91 | 11 |
| Conversion of ethylene, percent by weight |  | 77 | 93 |
| Yield of 1,2-dichloroethane, percent |  | 49.5 | 85.0 |
| Yield of higher chloroethanes, percent |  | 25 | 6 |

Example 2

When the general procedure of Example 1 is followed, with the same catalysts but using methane as the gas to be chlorinated to methyl chloride, typical temperatures in the same type and size of reaction vessel are:

|  | Series 1 | Series 2 | Series 3 |
|---|---|---|---|
| Inlet | 375 | 375 | 375 |
| 0.5 foot from top | 950 | 420 | 440 |
| 1.0 foot from top |  | 440 | 450 |
| 1.5 feet from top |  | 470 | 454 |
| 2.0 feet from top |  | 520 | 458 |
| 2.5 feet from top | see note | 540 | 456 |
| 3.0 feet from top |  | 510 | 456 |
| 3.5 feet from top |  | 475 | 452 |
| 4.0 feet from top |  | 460 | 448 |
| 4.5 feet from top |  | 440 | 450 |
| Temperature gradient, degrees | 575 | 120 | 18 |
| Yield of methyl chloride | 0 | 60 | 85 |
| Yield of higher chlorinated products | 0 | 40 | 15 |

NOTE.—Reactor melted near hot spot; no product recovered.

It is seen that in those series of runs in which silicon carbide was used as diluent, the temperature control and yield of desired product were far superior to those in which no diluent was used as well as those in which the diluent was the same as the inert carrier used to support the copper chloride. Similarly advantageous results are obtained when the invention is applied to the chlorination of benzene.

It is to be understood that the chloride of copper may be initially cuprous chloride, cupric oxychloride or cupric chloride, but that, when such a chloride is exposed at elevated temperatures to air or oxygen and hydrogen chloride, it is converted promptly to cupric chloride.

We claim:

1. In the oxychlorination of hydrocarbons by passing a mixture of hydrocarbon, hydrogen chloride and elemental oxygen through a fixed bed of a chloride of copper supported on particles of alumina, the improvement which consists in diluting the copper chloride bearing particles in said bed by intermingling them with from 3 to 20 volumes of silicon carbide particles for each volume of the copper chloride bearing particles.

2. The improvement claimed in claim 1, wherein the ratio of silicon carbide particles intermingled with the copper chloride bearing particles is greater near the inlet end of the reaction zone than near the outlet.

3. The improvement claimed in claim 2, wherein the said ratio diminishes gradually from the inlet toward the outlet.

4. The improvement claimed in claim 1, wherein the hydrocarbon subjected to oxychlorination is ethylene.

5. The improvement claimed in claim 1, wherein the hydrocarbon subjected to oxychlorination is methane.

6. The improvement claimed in claim 1, wherein the hydrocarbon subjected to oxychlorination is benzene.

References Cited in the file of this patent

UNITED STATES PATENTS

| 2,407,828 | Gorin | Sept. 17, 1946 |
| 2,615,900 | Sears | Oct. 28, 1952 |
| 2,644,846 | Johnson et al. | July 7, 1953 |
| 2,746,844 | Johnson et al. | May 22, 1956 |

FOREIGN PATENTS

| 312,733 | Great Britain | June 6, 1929 |